United States Patent
Lee et al.

(10) Patent No.: US 12,095,069 B2
(45) Date of Patent: Sep. 17, 2024

(54) POWER NET APPARATUS OF THE FUEL CELL AND CONTROL METHOD THEREOF

(71) Applicants: Kia Corporation, Seoul (KR); Hyundai Motor Company, Seoul (KR); Kookmin University Industry Academy Cooperation Foundation, Seoul (KR)

(72) Inventors: Yong Hwi Lee, Suwon-si (KR); Young Woo Noh, Guri-si (KR); Chung Wook Roh, Seoul (KR); Hee Seong Jeong, Namyangju-si (KR); Dong Woo Kwon, Incheon (KR); Gun Woo Park, Pyeongtaek-si (KR); Kang Hyun Woo, Seoul (KR)

(73) Assignees: Hyundai Motor Company, Seoul (KR); Kia Corporation, Seoul (KR); Kookmin University Industry Academy Cooperation Foundation, Seoul (KR)

(*) Notice: Subject to any disclaimer, the term of this patent is extended or adjusted under 35 U.S.C. 154(b) by 33 days.

(21) Appl. No.: 18/053,272

(22) Filed: Nov. 7, 2022

(65) Prior Publication Data
US 2024/0021923 A1    Jan. 18, 2024

(30) Foreign Application Priority Data
Jul. 13, 2022   (KR) .......................... 10-2022-0086500

(51) Int. Cl.
*H01M 16/00* (2006.01)
*B60L 7/10* (2006.01)
(Continued)

(52) U.S. Cl.
CPC ............. *H01M 16/003* (2013.01); *B60L 7/10* (2013.01); *B60L 50/40* (2019.02); *B60L 50/70* (2019.02);
(Continued)

(58) Field of Classification Search
CPC . H01M 16/003; H01M 2250/20; B60L 50/70; B60L 7/10; B60L 2210/12; H02P 27/06
See application file for complete search history.

(56) References Cited

U.S. PATENT DOCUMENTS 6,777,909 B1   8/2004  Aberle et al.
6,847,127 B1   1/2005  Lee
(Continued)

FOREIGN PATENT DOCUMENTS

CN       109263488 A       1/2019
CN       110979039 A       4/2020
(Continued)

*Primary Examiner* — Jared Fureman
*Assistant Examiner* — Duc M Pham
(74) *Attorney, Agent, or Firm* — Slater Matsil, LLP (57) ABSTRACT

In an embodiment a power apparatus includes a fuel cell configured to supply power to an inverter of a vehicle, a supercapacitor configured to assist the fuel cell, a bidirectional converter configured to charge and discharge the fuel cell and the supercapacitor and a controller configured to drive the vehicle by controlling the supercapacitor to be charged and discharged depending on a current required by the inverter for driving the vehicle and to assist the fuel cell.

20 Claims, 7 Drawing Sheets

(51) Int. Cl.
  *B60L 50/40*  (2019.01)
  *B60L 50/70*  (2019.01)
  *H02P 27/06*  (2006.01)

(52) U.S. Cl.
  CPC .......... *H02P 27/06* (2013.01); *B60L 2210/12* (2013.01); *B60L 2210/14* (2013.01); *H01M 2250/20* (2013.01); *H01M 2250/402* (2013.01)

(56) References Cited

U.S. PATENT DOCUMENTS

| | | | |
|---|---|---|---|
| 2005/0184594 A1* | 8/2005 | Fredette | H02J 3/32 307/78 |
| 2016/0016479 A1* | 1/2016 | Khaligh | H02M 1/4258 336/170 |
| 2021/0175527 A1* | 6/2021 | Lee | H01M 8/04089 |

FOREIGN PATENT DOCUMENTS

| | | | | |
|---|---|---|---|---|
| JP | 2003518357 A | | 6/2003 | |
| JP | 2021082493 A | | 5/2021 | |
| KR | 20030075375 A | * | 9/2003 | ............. H01M 8/04 |
| KR | 1020040001776 A | | 1/2004 | |
| KR | 102263517 B | | 6/2021 | |
| KR | 1020220044226 A | | 4/2022 | |

\* cited by examiner

POWER NET APPARATUS OF THE FUEL CELL AND CONTROL METHOD THEREOF

CROSS-REFERENCE TO RELATED APPLICATIONS

This application claims the benefit of Korean Application No. 10-2022-0086500, filed on Jul. 13, 2022, which application is hereby incorporated herein by reference.

TECHNICAL FIELD

The present disclosure relates to a power net apparatus for a fuel cell and a control method thereof, and more particularly, to a technique capable of reducing a volume and cost of the power net apparatus.

BACKGROUND

A fuel cell, which converts chemical energy into electrical energy by using a redox reaction of hydrogen and oxygen supplied from a hydrogen supply device and an air supply device, respectively, includes a fuel cell stack that generates electric energy and a cooling system for cooling the fuel cell stack.

Figure 1:
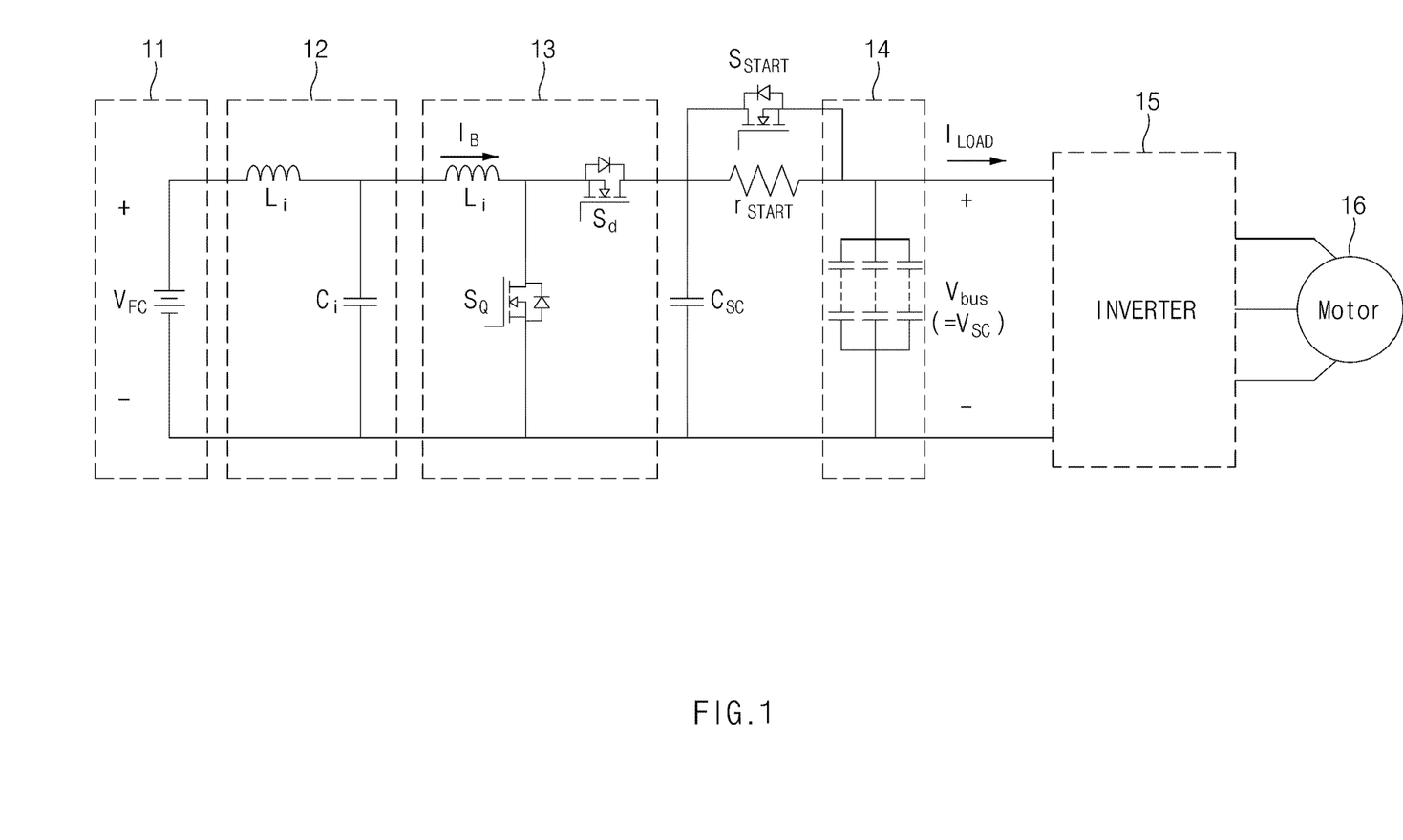
FIG. 1 illustrates a configuration diagram of a power net apparatus of a conventional hydrogen fuel cell electric vehicle.

As illustrated in FIG. 1, a conventional power net apparatus includes a fuel cell 11, an input filter 12, a converter 13, a supercapacitor 14, an inverter 15, and a motor 16, and the fuel cell 101 and the supercapacitor 14 are connected in parallel.

As such, in the conventional parallel connection, a voltage of the supercapacitor 14 and a voltage of the fuel cell 11 should each be boosted to an inverter driving voltage, and thus the supercapacitor 14 also requires a high withstand voltage. Accordingly, a number of cells inside the supercapacitor 14 increases, thereby increasing the volume and cost of the power net apparatus.

In addition, due to the parallel structure of the fuel cell 11 and the supercapacitor 14, the supercapacitor 14 may discharge only up to the voltage of the fuel cell 11, so the efficiency of using the supercapacitor 14 is low.

The above information disclosed in this Background section is only for enhancement of understanding of the background of the disclosure, and therefore, it may contain information that does not form the prior art that is already known in this country to a person of ordinary skill in the art.

SUMMARY

Embodiments provide a power net apparatus for a fuel cell and a control method thereof, capable of reducing a weight and cost of a vehicle and increasing use efficiency of a supercapacitor by decreasing a volume of the supercapacitor in a fuel cell electric vehicle.

Embodiments provide a power net apparatus for a fuel cell electric vehicle, including: a fuel cell configured to supply power to an inverter of the vehicle; a supercapacitor configured to assist the fuel cell; a bidirectional converter configured to charge and discharge the fuel cell and the supercapacitor; and a controller configured to drive the vehicle by controlling the supercapacitor to be charged and discharged depending on a current required by the inverter for driving the vehicle to assist the fuel cell.

In an exemplary embodiment of the present disclosure, the fuel cell and the supercapacitor may be connected in series.

In an exemplary embodiment of the present disclosure, the controller may be configured to determine a voltage for driving the vehicle by summing a voltage of the fuel cell and a voltage of the supercapacitor.

In an exemplary embodiment of the present disclosure, the bidirectional converter may be configured to include a first switch and a second switch connected in series with the first switch.

In an exemplary embodiment of the present disclosure, the first switch and the second switch may be connected in parallel to the fuel cell and the supercapacitor.

In an exemplary embodiment of the present disclosure, the bidirectional converter may be configured to operate as a buck converter or a boost converter.

In an exemplary embodiment of the present disclosure, the controller may be configured to perform operation in a pre-charge mode to charge the supercapacitor before driving the vehicle.

In an exemplary embodiment of the present disclosure, the controller may be configured to control the bidirectional converter to operate as a boost converter to charge the supercapacitor by controlling a current of the fuel cell.

In an exemplary embodiment of the present disclosure, the controller may be configured to determine a steady-state mode to drive the vehicle by using the fuel cell depending on the current required by the inverter of the vehicle, a peak-load mode to drive the vehicle by using both the fuel cell and the supercapacitor, and a regeneration mode to charge the supercapacitor by using power generated during regenerative braking.

In an exemplary embodiment of the present disclosure, the controller may be configured to determine whether the current required by the inverter is equal to or greater than a predetermined maximum current value of the fuel cell, and to operate the inverter in a heavy peak-mode among peak-load modes when the current required by the inverter is equal to or greater than the predetermined maximum current value of the fuel cell.

In an exemplary embodiment of the present disclosure, the controller may be configured to turn on and off the first switch to operate the bidirectional converter as a buck converter to limit the current of the fuel cell and discharge the supercapacitor.

In an exemplary embodiment of the present disclosure, the controller may be configured to reduce a voltage of the supercapacitor by discharging the supercapacitor to a minimum operating voltage.

In an exemplary embodiment of the present disclosure, the controller may be configured to perform operation in a light peak-load mode among peak-load modes when a value obtained by multiplying a value, obtained by dividing a voltage across the fuel cell by an output voltage, by a maximum current value of the fuel cell is smaller than or equal to the current required by the inverter, and the current required by the inverter is smaller than the maximum current value of the fuel cell, and to operate the bidirectional converter as a boost converter by turning on and off the second switch.

In an exemplary embodiment of the present disclosure, the controller may be configured to perform operation in the steady state mode when the current required by the inverter is greater than 0 and smaller than the value obtained by multiplying a value, obtained by dividing a voltage across the fuel cell by an output voltage, by a maximum current value of the fuel cell, and to operate the bidirectional converter as a boost converter by turning on and off the second switch.

In an exemplary embodiment of the present disclosure, the controller may be configured to control an output current of the fuel cell when performing operation in the steady-state mode to charge the supercapacitor, and to control a current of the fuel cell not to exceed a predetermined maximum current value through constant current constant voltage (CCCV) control when the supercapacitor reaches a rated voltage.

In an exemplary embodiment of the present disclosure, the controller may be configured to perform operation in the regenerative mode to limit a current of the fuel cell when the current required by the inverter is smaller than 0, and to charge the supercapacitor 102 by using power generated during the regenerative braking and to operate the bidirectional converter as a buck converter by turning the first switch on and off.

In an exemplary embodiment of the present disclosure, it may further include an inductor provided between a node between the first switch and the second switch and a node between the fuel cell and the supercapacitor.

In an exemplary embodiment of the present disclosure, the controller is configured to control an output current of the fuel cell by using a current flowing through the inductor.

An exemplary embodiment of the present disclosure provides a control method of a power net apparatus for a fuel cell vehicle including: a fuel cell configured to supply power to an inverter of the vehicle; a supercapacitor configured to assist the fuel cell; a bidirectional converter configured to charge and discharge the fuel cell and the supercapacitor, the method comprising driving, by a controller, the vehicle by controlling the supercapacitor to be charged and discharged depending on a current required by the inverter for driving the vehicle to assist the fuel cell.

In an exemplary embodiment of the present disclosure, it may further include: performing, by the controller, operation in a pre-charge mode to charge the supercapacitor before driving the vehicle; and determining, by the controller, a steady-state mode to drive the vehicle by using a fuel cell depending on the current required by the inverter, a peak-load mode to drive the vehicle by using both the fuel cell and the supercapacitor, and a regeneration mode to charge the supercapacitor by using power generated during regenerative braking.

Embodiments provide the possibility to reduce a weight and cost of a vehicle and increase use efficiency of a supercapacitor by decreasing a volume of the supercapacitor in a fuel cell electric vehicle.

Further, various embodiments provide effects that can be directly or indirectly identified through this document.

DETAILED DESCRIPTION OF ILLUSTRATIVE EMBODIMENTS

Hereinafter, some exemplary embodiments of the present disclosure will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present disclosure will be described in detail with reference to FIG. 2 to FIG. 7.

Figure 2:
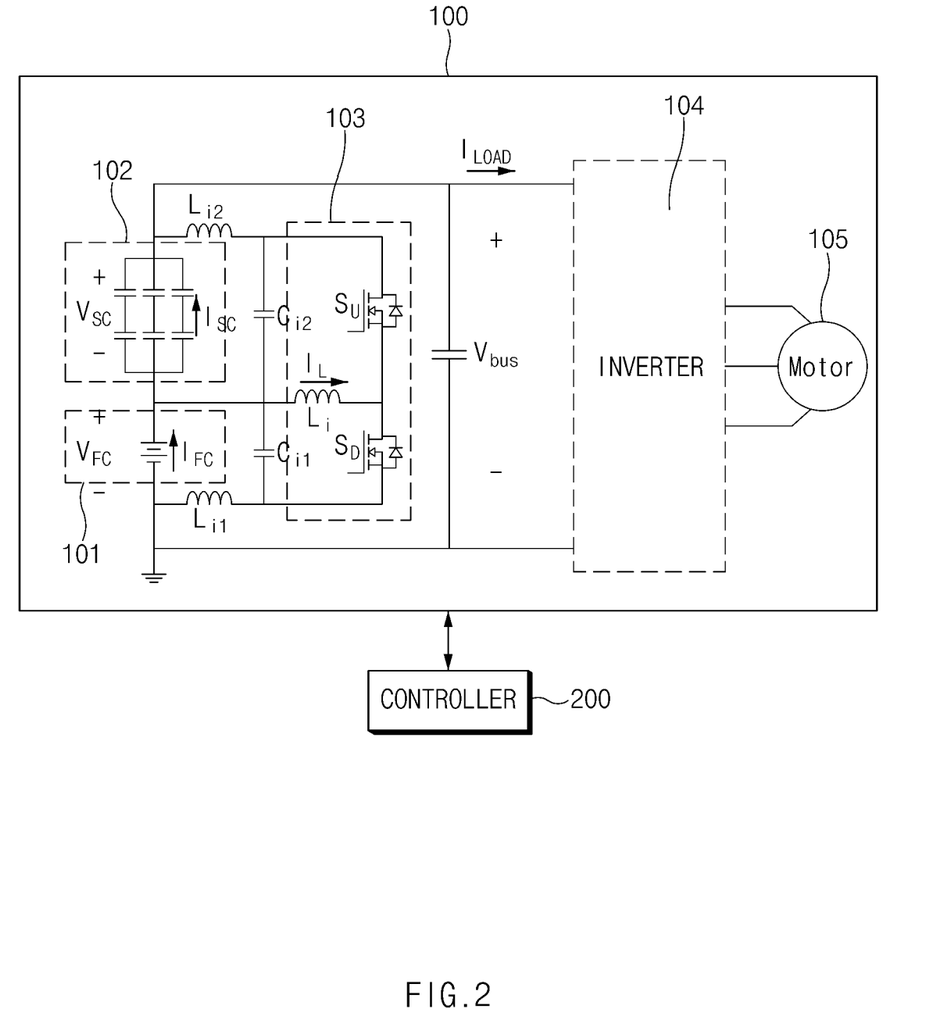
FIG. 2 illustrates a configuration diagram of a power net apparatus of a hydrogen fuel cell electric vehicle.

FIG. 2 illustrates a configuration diagram of a power net apparatus of a hydrogen fuel cell electric vehicle according to an embodiment of the present disclosure.

The power net apparatus 100 according to the exemplary embodiment of the present disclosure may be implemented inside vehicle path the vehicle. In this case, the power net apparatus 100 for the fuel cell electric vehicle may be integrally formed with internal control units of the vehicle, or may be implemented as a separate device to be connected to control units of the vehicle by a separate connection means.

The power net apparatus 100 for the fuel cell electric vehicle may reduce a voltage of a supercapacitor by a voltage of a fuel cell from a current required by an inverter by connecting the fuel cell and the supercapacitor in series and including them. In addition, since the supercapacitor can be discharged to a minimum operating voltage, use efficiency may be increased. As a result, the voltage of the supercapacitor may be lowered so as to reduce the number of cells, and a charging voltage of the supercapacitor may be lowered so as to reduce an inrush current phenomenon during initial charging.

In addition, the power net apparatus moo may minimize a volume by including a single bidirectional converter 103 instead of a unidirectional DC/DC converter for a hydrogen fuel cell and a bidirectional DC/DC converter for charging and discharging a supercapacitor. That is, the power net apparatus 100 may supply power required to drive the vehicle by connecting a fuel cell 101 and a supercapacitor 102 in series and charging and discharging the supercapacitor 102 with one bidirectional converter 103 (DC/DC converter).

Referring to FIG. 2, the power net apparatus 100 for a hydrogen fuel cell vehicle according to an exemplary embodiment of the present disclosure may include the fuel cell 101, the supercapacitor 102, the bidirectional converter 103, an inverter 104, a motor 105, inductors $L_i$, $L_{i1}$ and $L_{i2}$, and capacitors $C_{i1}$ and $C_{i2}$.

The fuel cell 101 and the supercapacitor 102 are connected in series to provide power to the inverter 104.

Capacitors $C_{i1}$ and $C_{i2}$ connected in series are connected in parallel with the fuel cell 101 and the supercapacitor 102, respectively.

The bidirectional converter 103 converts power, and in the present disclosure, it may be driven by a buck converter or a boost converter. In this case, the buck converter is a DC-DC switch-mode power supply for stabilizing an input voltage of an unregulated DC supply to buck or step down it to a lower output voltage, and is also called a step-down converter. The buck converter may output most of inputted power as it is. The boost converter is a DC-DC switch-mode power supply for stabilizing the input voltage of an unregulated DC supply to boost or increase it to a lower output voltage, and is called a step-up converter.

The bidirectional converter 103 may include switches $S_U$ and $S_D$ connected in series.

The switches $S_U$ and $S_D$ are connected in parallel with the capacitors $C_{i1}$ and $C_{i2}$. A voltage $V_{bus}$ across output terminals by the fuel cell 101 and the supercapacitor 102 is applied to the inverter 104.

The fuel cell 101 is connected in series with the supercapacitor 102 so that the output voltage $V_{bus}$ required for driving the vehicle is a sum of a voltage $V_{FC}$ across the fuel cell 101 and a voltage $V_{SC}$ across the supercapacitor 102.

Accordingly, the voltage $V_{SC}$ across the supercapacitor 102 may be reduced by the voltage $V_{FC}$ across the fuel cell 101 for an output of the voltage $V_{bus}$ required for driving the vehicle. When the voltage $V_{SC}$ across the supercapacitor 102 decreases, a number of serially connected unit cells in the supercapacitor 102 may be reduced and an inrush current prevention circuit may be reduced during initial charging, thereby reducing a volume of the supercapacitor 102 and reducing the cost.

In addition, according to the present disclosure, the bidirectional converter 103 controls a current $I_{FC}$ of the fuel cell 101 rather than control of a current $I_{SC}$ of the supercapacitor 102. The current $I_{FC}$ of the fuel cell may be controlled by adjusting a reference value $I_{L,ref}$ of the inductor current Li of the bidirectional converter 103 depending on an inverter requiring current $I_{LOAD}$.

In this case, boost topology may be operated differently depending on an operation of the vehicle. That is, the power net apparatus wo for the fuel cell electric vehicle may classify a vehicle driving mode depending on a magnitude and sign of the inverter requiring current $I_{LOAD}$. The vehicle driving mode may include a pre-charge mode, a steady-state mode, a peak-load mode, and a regeneration mode. The bidirectional converter 103 may operate as the boost converter or the buck converter depending on the vehicle driving mode.

The power net apparatus wo for the fuel cell electric vehicle charges and discharges the supercapacitor 102 by controlling the current of the fuel cell 101 through the switches $S_U$ and $S_D$ in a PWM method, and supplies power required for the vehicle.

The pre-charge mode is an operation mode that charges the supercapacitor 102 before driving the vehicle, and the bidirectional converter 103 of the power net apparatus 100 for the fuel cell electric vehicle operates as a boost converter to control the current of the fuel cell 101 and to charge the supercapacitor 102.

The steady-state mode is an operation mode in which the vehicle is driven only by the fuel cell 101, and the bidirectional converter 103 operates as a boost converter to charge the supercapacitor 102 using remaining power after driving in the fuel cell 101.

The peak-mode is an operation mode that drives the vehicle by using both fuel cell 101 and the supercapacitor 102, and when a high current is required from the inverter of the vehicle, it is an operation of compensating for an insufficient current of the fuel cell 101 by using the supercapacitor 102.

In this case, in a light peak-load mode, the bidirectional converter 103 operates as a boost converter, while in the heavy peak-load mode, the bidirectional converter 103 operates as a buck converter to limit the current of the fuel cell 101 and discharge the supercapacitor 102.

The regeneration mode is an operation mode in which the supercapacitor 102 is charged using power generated during regenerative braking, and the bidirectional converter 103 operates as a buck converter to limit the current so that the current does not flow in the fuel cell 101 and charges the supercapacitor 102 using power generated during regenerative braking.

In this case, in the modes other than the pre-charge mode, operation may be performed based on the inverter requiring current $I_{LOAD}$, which is a current required by the vehicle inverter 104. That is, when the inverter requiring current $I_{LOAD}$ is high, operation may be performed in the peak-load mode, when the inverter requiring current $I_{LOAD}$ is low, operation may be performed in the steady-state mode, and when the inverter requiring current $I_{LOAD}$ is negative, operation may be performed in the regeneration mode. Standard of the inverter requiring current $I_{LOAD}$ may be determined by performance of the fuel cell 101 and the inverter 104.

In addition, the bidirectional converter 103 may be implemented as a boost converter, a buck converter, or the like, and may charge or discharge the supercapacitor 102 using other topologies. In this case, an $I_{L,ref}$ equation for controlling the current of the fuel cell 101 is different depending on each of the topologies, so a controller suitable for it is required.

The inverter 104 drives a motor 105 to rotate wheels of the vehicle.

The controller 200 may be electrically connected to internal components of the power net apparatus 100 for the fuel cell electric vehicle, may electrically control each component, and may be an electrical circuit that executes software commands, thereby performing various data processing and calculations described below.

The controller 200 may be implemented in the form of hardware, software, or a combination of hardware and software. For example, the controller 40 may be implemented as a microprocessor, but the present disclosure is not limited thereto. The controller 200 may be, e.g., an electronic control unit (ECU), a micro controller unit (MCU), or other subcontrollers mounted in the vehicle.

The controller 200 may be operated in the pre-charge mode to charge the supercapacitor 102 before driving the vehicle.

The controller 200 may charge the supercapacitor 102 by controlling the current of the fuel cell 101 by operating the bidirectional converter 103 as a boost converter.

The controller 200 may determine the steady-state mode to drive the vehicle by using a fuel cell depending on the inverter requiring current, the peak-load mode to drive the vehicle by using both the fuel cell and the supercapacitor 102, and the regeneration mode to charge the supercapacitor 102 by using power generated during regenerative braking.

The controller 200 may determine whether the inverter requiring current is equal to or greater than a predetermined maximum current value of the fuel cell. In addition, when the inverter requiring current is equal to or greater than the predetermined maximum current value of the fuel cell, the controller 200 may perform operation in a heavy peak-mode among the peak-load modes.

The controller 200 may turns on and off the first switch S u to operate the bidirectional converter 103 as a buck converter to limit the current of the fuel cell and discharge the supercapacitor 102.

The controller 200 may reduce a voltage of the supercapacitor 102 by discharging the supercapacitor 102 to a minimum operating voltage.

The controller 200 may perform operation in a light peak-load mode among the peak-load modes when a value obtained by multiplying a value, obtained by dividing the voltage across the fuel cell by the output voltage, by a maximum current value of the fuel cell is smaller than or equal to the inverter requiring current, and the inverter requiring current is smaller than the maximum current value of the fuel cell. In addition, the controller 200 may turn on and off the second switch $S_D$ to operate the bidirectional converter 103 as a boost converter.

The controller 200 may perform operation in the steady-state mode, and may operate the bidirectional converter 103 as a boost converter by turning the second switch on and off when the inverter requiring current is greater than 0 and smaller than the value obtained by multiplying the value, obtained by dividing the voltage across the fuel cell by the output voltage, by the maximum current value of the fuel cell.

The controller 200 may control an output current of the fuel cell 101 when performing operation in the steady-state mode to charge the supercapacitor 102, and may control the current of the fuel cell 101 not to exceed a predetermined maximum current value through constant current constant voltage (CCCV) control when the supercapacitor 102 reaches a rated voltage.

The controller 200 may perform operation in the regeneration mode to limit the current of the fuel cell when the inverter requiring current is smaller than 0, and may charge the supercapacitor 102 by using power generated during regenerative braking and turn the first switch on and off to operate the bidirectional converter 103 as a buck converter.

The controller 200 may control the output current of the fuel cell by using the current flowing through the inductor.

Figure 3:
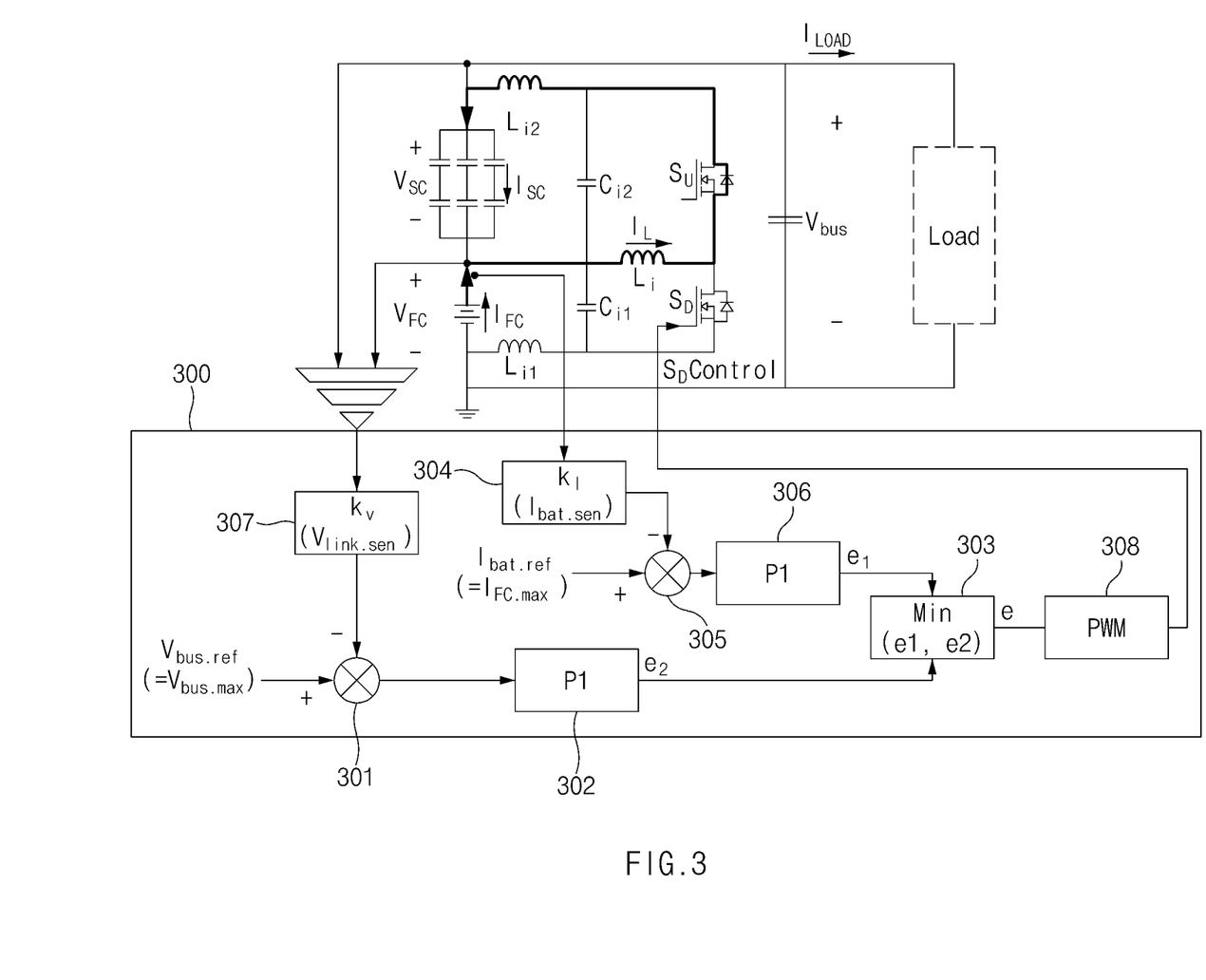
FIG. 3 illustrates a view for describing an operation method for each of a pre-charge mode, a steady-state mode, and a light peak-load mode according to an exemplary embodiment of the present disclosure.

FIG. 3 illustrates a view for describing an operation method for each of a pre-charge mode, a steady-state mode, and a light peak-load mode according to an exemplary embodiment of the present disclosure. That is, the operation method for each vehicle control mode when the boost converter is operated will be described.

Referring to FIG. 3, the pre-charge mode is an operation of charging the supercapacitor 102 with the fuel cell 101 when there is no current required by the inverter immediately after the vehicle is started and before driving the vehicle. The bidirectional converter 103 of the power net apparatus 100 for the fuel cell electric vehicle operates as a boost converter through an on-off operation of the switch $S_D$ after the switch $S_U$ is turned off, and charges the supercapacitor 102 through constant current constant voltage (CCCV) control. An input voltage of the power net apparatus 100 for the fuel cell electric vehicle is the fuel cell voltage $V_{FC}$, and the output voltage $V_{bus}$ is a sum of the fuel cell voltage $V_{FC}$ and the supercapacitor voltage $V_{SC}$. In this case, no inrush current occurs in the supercapacitor voltage $V_{SC}$, so the inrush current prevention circuit is unnecessary.

The steady-state mode is an operation of charging the fuel cell 101 through a remaining current when the current required by the inverter 104 is satisfied only with the fuel cell 101 current after driving the vehicle. The bidirectional converter 103 of the power net apparatus 100 for the fuel cell electric vehicle operates as a boost converter through the switch $S_D$, and controls the output current of the fuel cell 101 to charge the supercapacitor 102. When a voltage of the supercapacitor 102 reaches a rated voltage, the voltage of the supercapacitor 102 is constantly maintained through the CCCV control.

The light peak-mode indicates an operation of driving the vehicle using the fuel cell 101 and the supercapacitor 102 when the inverter requiring current $I_{Load}$ during vehicle acceleration is higher than $(V_{FC}/V_{bus}) \times I_{FC}$ and lower than a maximum current $I_{FC.max}$ of the fuel cell 101. The bidirectional converter 103 of the power net apparatus 100 for the fuel cell electric vehicle operates as a boost converter through the switch $S_D$ and controls the current $I_{FC}$ of the fuel cell 101 not to exceed the maximum current $I_{FC.max}$ of the fuel cell 101 through the CCCV control.

The controller 300 calculates a value 307 obtained by multiplying the voltage $V_{SC}$ across the supercapacitor by $K_v$ and a predetermined maximum output voltage ($V_{bus.max} = V_{bus.ref}$) (301), and outputs an output value e2 by performing proportional integral (PI) control using a calculation result thereof (302).

In addition, the controller 300 calculates a value obtained by multiplying the fuel cell current $I_{FC}$ by $K_I$ (304) and a maximum fuel cell current value ($I_{FC.max} = I_{bat.ref}$) (305), and PI controls a calculation result thereof to output an output value e1 (306).

The controller 300 selects a minimum value "e" from among the output values e1 and e2 (303), and outputs a pulse width modulation (PWM) output signal to the switch $S_D$ by using the minimum value e (308).

Figure 4:
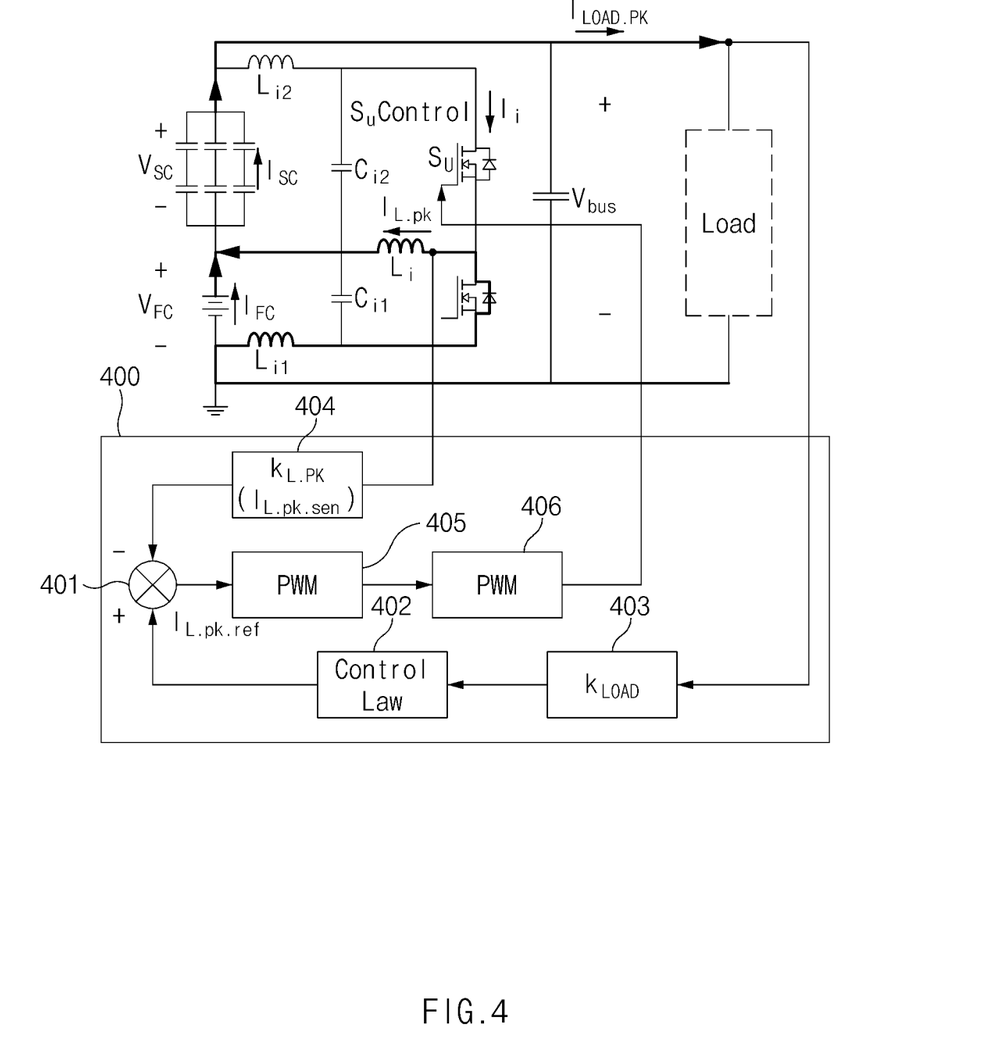
FIG. 4 illustrates a view for describing a method for controlling an operation of a heavy peak-load mode according to an exemplary embodiment of the present disclosure.

FIG. 4 illustrates a view for describing a method for controlling an operation of a heavy peak-load mode according to an exemplary embodiment of the present disclosure.

Referring to FIG. 4, the heavy peak-load mode indicates an operation for compensating for a current in the supercapacitor 102 when the inverter requiring current $I_{LOAD}$ is higher than the maximum current of the fuel cell 101 during acceleration after driving the vehicle. The bidirectional converter 103 of the power net apparatus 100 for the fuel cell electric vehicle operates as a buck converter through the switch $S_U$, and discharges the supercapacitor 102 by limiting the output current of the fuel cell 101. Accordingly, the voltage of the supercapacitor 102 may decrease, and the supercapacitor voltage $V_{SC}$ may be discharged up to 0 V.

The output current $I_{FC}$ of the fuel cell 101 is controlled by using the current $I_{L.PK}$ flowing through the inductor $L_i$. Accordingly, $I_{L.PK}$ is expressed as a formula, and $I_{L.PK.ref}$ is calculated to control it. The following equation is derived through a CCM buck converter input and output relational expression and a Kirchhoff current law (KCL) of the power net apparatus 100 for the fuel cell electric vehicle.

$$\frac{V_{FC}}{V_{SC}+V_{FC}} = \frac{I_i}{I_L} \quad \text{(Equation 1)}$$

$$I_i = I_{SC} - I_{Load} \quad \text{(Equation 2)}$$

$$I_{SC} = I_{FC} + I_L \quad \text{(Equation 3)}$$

Equation 4 and Equation 5 may be derived through Equation 1, Equation 2, and Equation 3. $V_{FC}$ indicates the voltage across the fuel cell 101, $V_{SC}$ indicates the voltage across the supercapacitor 102, $I_i$ indicates a value obtained by subtracting a current flowing to a load from a current of the supercapacitor 102, and $I_L$ indicates a current flowing through the inductor L.

When $I_L$ is $I_{L.PK}$, it may be derived as Equation 4 below.

$$I_{L.PK} = (I_{LOAD.PK} - I_{FC})\frac{V_{FC}}{V_{SC}} + (I_{LOAD.PK} - I_{FC}) \quad \text{(Equation 4)}$$

$$I_{L.PK} = (I_{LOAD.PK} - I_{FC})\left(1 + \frac{V_{FC}}{V_{SC}}\right) \quad \text{(Equation 5)}$$

$I_{L.P.K.}$ indicates the current flowing through the inductor $L_i$, and $I_{LOAD.PK}$ indicates the current flowing to the load under a peak-load condition.

When Equation 4 is arranged according to time t, it is the same as Equation 6 below, and when Equation 5 is arranged according to time t, Equation 7 below.

$$I_{L.PK.ref} = \quad \text{(Equation 6)}$$
$$(I_{LOAD.PK}(t) - I_{FC.max})\frac{V_{FC}(t)}{V_{SC}(t)} + (I_{LOAD.PK}(t) - I_{FC.max})$$

$$I_{L.PK.ref} = (I_{LOAD.pk}(t) - I_{FC.max})\left(1 + \frac{V_{FC}(t)}{V_{SC}(t)}\right) \quad \text{(Equation 6)}$$

$I_{L.PK.ref}$ indicates a current control value for controlling the fuel cell current such that the fuel cell current does not exceed a predetermined maximum output current value $I_{FC.max}$.

A controller 400 multiplies the inverter requiring current $I_{LOAD.PK}$ by $K_{LOAD}$ (403), determines a vehicle mode according to the inverter requiring current multiplied by $K_{LOAD}$ (402), outputs $I_{L.PK.ref}$ by using a value 404 obtained by multiplying an inductor current $I_{L.PK}$ by $K_{L.PK}$ depending on the determined vehicle mode (401), performs PI control (405), and transmits a PWM signal to the switch $S_U$ using a PI control result thereof (406).

Figure 5:
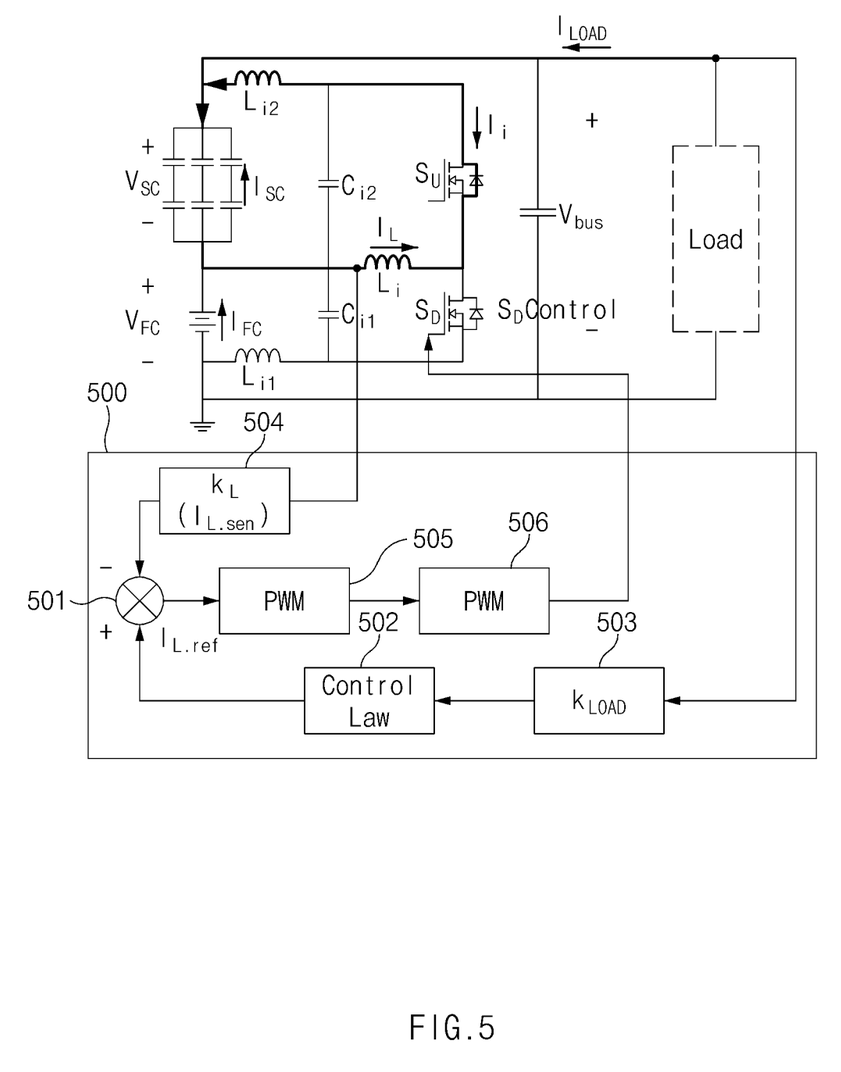
FIG. 5 illustrates a view for describing a method for controlling an operation of a regeneration mode according to an exemplary embodiment of the present disclosure.

FIG. 5 illustrates a view for describing a method for controlling an operation of a regeneration mode according to an exemplary embodiment of the present disclosure.

Referring to FIG. 5, the regeneration mode indicates an operation of charging the supercapacitor 102 through power generated by regenerative braking of a motor when the vehicle is decelerated or driving downhill. The bidirectional converter 103 of the power net apparatus 100 for the fuel cell electric vehicle may turn off the switch $S_U$, may operate as a buck converter through an on and off operation of the switch $S_D$, and may enable a regenerative braking power to charge the supercapacitor 102 by controlling a current of the fuel cell 101 to 0 ($I_{FC}$=0 A).

The output current $I_{FC}$ of the fuel cell 101 is controlled by using a current $I_L$ flowing through the inductor $L_i$. Accordingly, $I_L$ is expressed as Equation 9 below, and $I_{L.ref}$ is obtained to control it. The following equation is derived through a CCM buck converter input and output relational expression and a Kirchhoff current law (KCL) of the power net apparatus 100 for the fuel cell electric vehicle.

$$I_i = I_{LOAD}(\text{for } I_{FC} = 0) \quad \text{(Equation 8)}$$

Equation 10 may be dereived using Equations 1 and 8.

$$I_L = I_{LOAD}\left(1 + \frac{V_{FC}}{V_{SC}}\right) \quad \text{(Equation 9)}$$

The current value $I_{L.ref}$ for controlling the current $I_L$ flowing in the inductor $L_i$ may be summarized as in Equation 10 below in the above-described manner.

$$I_{L.ref} + I_{LOAD}(t)\left(1 + \frac{V_{FC}(t)}{V_{SC}(t)}\right) \quad \text{(Equation 10)}$$

A controller 500 multiplies the inverter requiring current $I_{LOAD.PK}$ by $K_{LOAD}$ (503), determines a vehicle mode according to the inverter requiring current multiplied by $K_{LOAD}$ (502), outputs $I_{ref}$ by using a value 504 obtained by multiplying an inductor current $I_L$ by $K_L$ depending on the determined vehicle mode (501), performs PI control (505), and transmits a PWM signal to the switch $S_D$ using a PI control result thereof (506).

Figure 6:
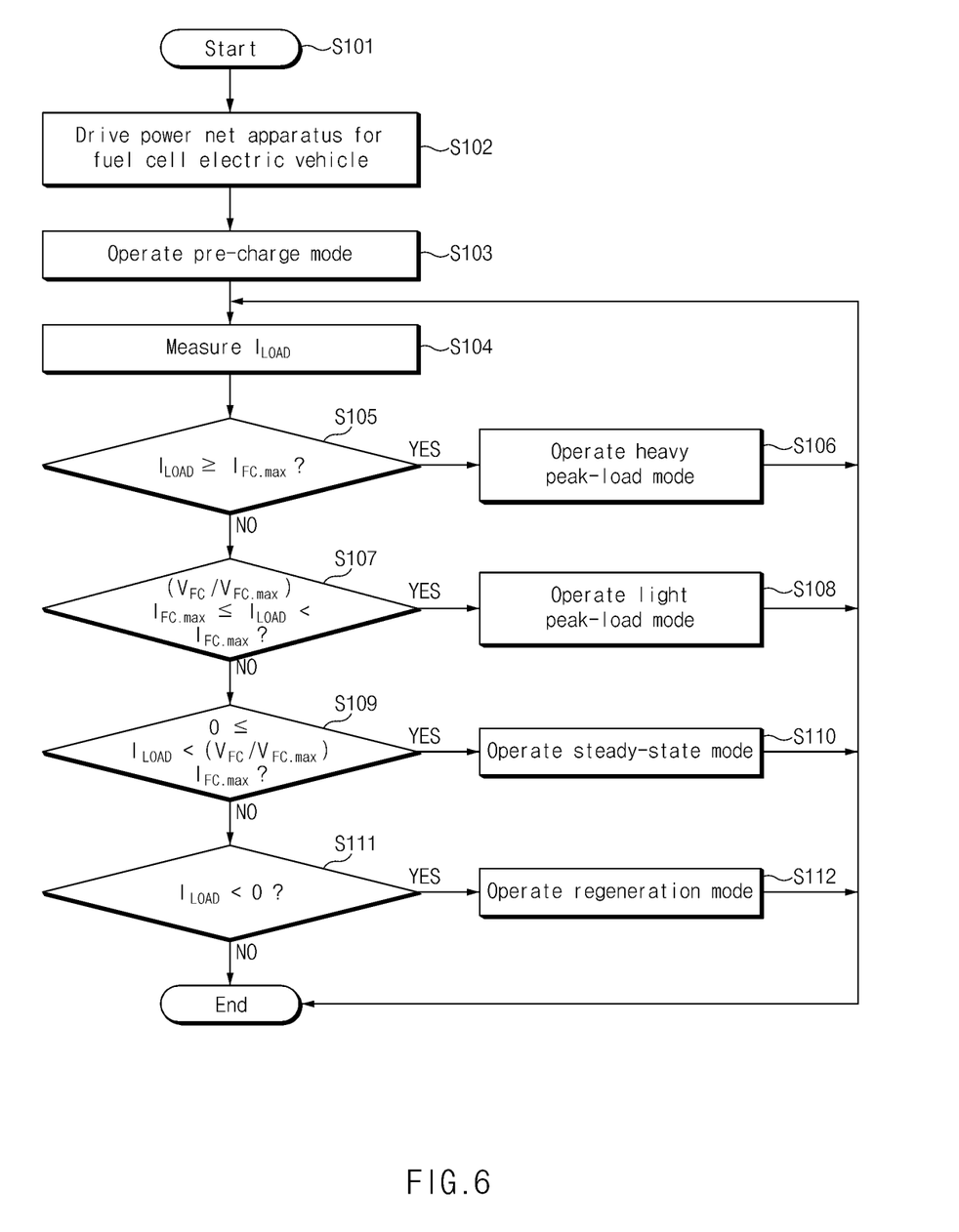
FIG. 6 illustrates a flowchart showing a power net control method for a fuel cell electric vehicle according to an exemplary embodiment of the present disclosure.

Hereinafter, a power net control method for a fuel cell vehicle according to an exemplary embodiment of the present disclosure will be described in detail with reference to FIG. 6. FIG. 6 illustrates a flowchart showing a power net control method for a fuel cell electric vehicle according to an exemplary embodiment of the present disclosure.

It provides a standard for the power net apparatus 100 for the fuel cell electric vehicle to operate to assist the fuel cell 101 by charging and discharging the supercapacitor 102 depending on the inverter requiring current $I_{LOAD}$.

Hereinafter, it is assumed that the power net control apparatus 100 of FIG. 2 performs a process of FIG. 6. In addition, in the description of FIG. 6, operations described as being performed by a device may be understood as being controlled by the controller 200 of the power net control apparatus 100 for the fuel cell electric vehicle.

Referring to FIG. 6, when the vehicle is started (S101), the power net apparatus 100 for the fuel cell electric vehicle starts to be driven (S102).

The power net apparatus 100 for the fuel cell electric vehicle operates in the pre-charge mode for pre-charging the supercapacitor 102 through the fuel cell 101 before the vehicle moves, i.e., before the inverter requiring current $I_{LOAD}$ is generated. In this case, a circuit operates as a boost converter, and the output voltage $V_{bus}$ has a maximum value ($V_{bus.ref}$=$V_{bus.max}$). A current of the fuel cell 101 is controlled to a maximum value ($I_{FC.ref}$=$I_{FC.max}$) (S103).

The power net apparatus wo for the fuel cell electric vehicle may measure the inverter requiring current $I_{LOAD}$ (S104), and hereinafter may determine a vehicle driving mode depending on the inverter requiring current $I_{LOAD}$.

The power net apparatus wo for the fuel cell electric vehicle determines whether the inverter requiring current $I_{LOAD}$ is higher than the maximum current value $I_{FC.max}$ of the fuel cell 101 (S105). When the inverter requiring current $I_{LOAD}$ is higher than the maximum current value $I_{FC.max}$ of the fuel cell 101, the power net apparatus wo for the fuel cell electric vehicle operates in the heavy peak-load mode (S106). In this case, the power net apparatus wo for the fuel cell electric vehicle operates as a buck converter. In this case, the current of the fuel cell 101 has the maximum current value $I_{FC.max}$ of the fuel cell 101 (current control value $I_{FC.ref}$=maximum current value $I_{FC.max}$).

The power net apparatus wo for the fuel cell electric vehicle determines whether the inverter requiring current $I_{LOAD}$ measured in step S104 is greater than $(V_{FC}/V_{bus})I_{FC.max}$ and smaller than the maximum current value $I_{FC.max}$ of the fuel cell 101 (S107). When the inverter requiring current $I_{LOAD}$ is greater than $(V_{FC}/V_{bus})I_{FC.max}$ and smaller than the maximum current value $I_{FC.max}$ of the fuel cell 101, the power net apparatus wo for the fuel cell electric vehicle operates in the light peak-load mode (S108). In this case, the bidirectional converter 103 of the power net apparatus wo for the fuel cell electric vehicle operates as a boost converter, and the current of the fuel cell 101 is controlled not to exceed the maximum current value $I_{FC.max}$ of the fuel cell 101 ($I_{FC.ref}$=$I_{FC.max}$).

The power net apparatus wo for the fuel cell electric vehicle determines whether the inverter requiring current $I_{LOAD}$ measured in step S104 is smaller than the maximum current value $I_{FC.max}$ of the fuel cell 101 and greater than zero (S109). When the inverter requiring current $I_{LOAD}$ is smaller than the maximum current value $I_{FC.max}$ of the fuel cell 101 and greater than 0, the power net apparatus 100 for the fuel cell electric vehicle operates in the steady-state mode (S110). In this case, the bidirectional converter 103 of the power net apparatus 100 for the fuel cell electric vehicle operates as a boost converter, and the output voltage $V_{bus}$ has a voltage value suitable for the load ($V_{bus.ref}$=$V_{bus.nom}$). In addition, the current $I_{FC}$ of the fuel cell 101 for charging the supercapacitor 102 is kept at its maximum value ($I_{FC.ref}$=$I_{FC.max}$).

The power net apparatus 100 for the fuel cell electric vehicle determines whether the inverter requiring current $I_{LOAD}$ measured in step S104 is smaller than 0, i.e., whether regenerative braking is performed (S111).

When the inverter requiring current $I_{LOAD}$ is smaller than 0, the power net apparatus 100 for the fuel cell electric vehicle operates in the regeneration mode (S112). In this case, the power net apparatus 100 for the fuel cell electric vehicle operates as a buck converter, and controls the current of the fuel cell 101 to be zero ($I_{FC.ref}$=0).

As such, according to the present disclosure, the inverter requiring current may be formed by a sum of the fuel cell 101 and the supercapacitor 102 by fastening the fuel cell 101 and the supercapacitor 102 in series instead of in parallel. When the fuel cell 101 and the supercapacitor 102 are connected in series, the voltage of the supercapacitor 102 may be reduced by the voltage of the fuel cell 101 from an inverter driving voltage.

In addition, the supercapacitor 102 may be discharged to a minimum operating voltage by connecting the fuel cell 101 and the supercapacitor 102 in series, thereby increasing use efficiency.

In addition, the voltage of the supercapacitor 102 may be lowered to reduce a number of cells in the supercapacitor 102, thereby reducing a volume and cost of the supercapacitor 102. In addition, a charging voltage of the supercapacitor 102 may be lowered to reduce an inrush current phenomenon during initial charging.

Figure 7:
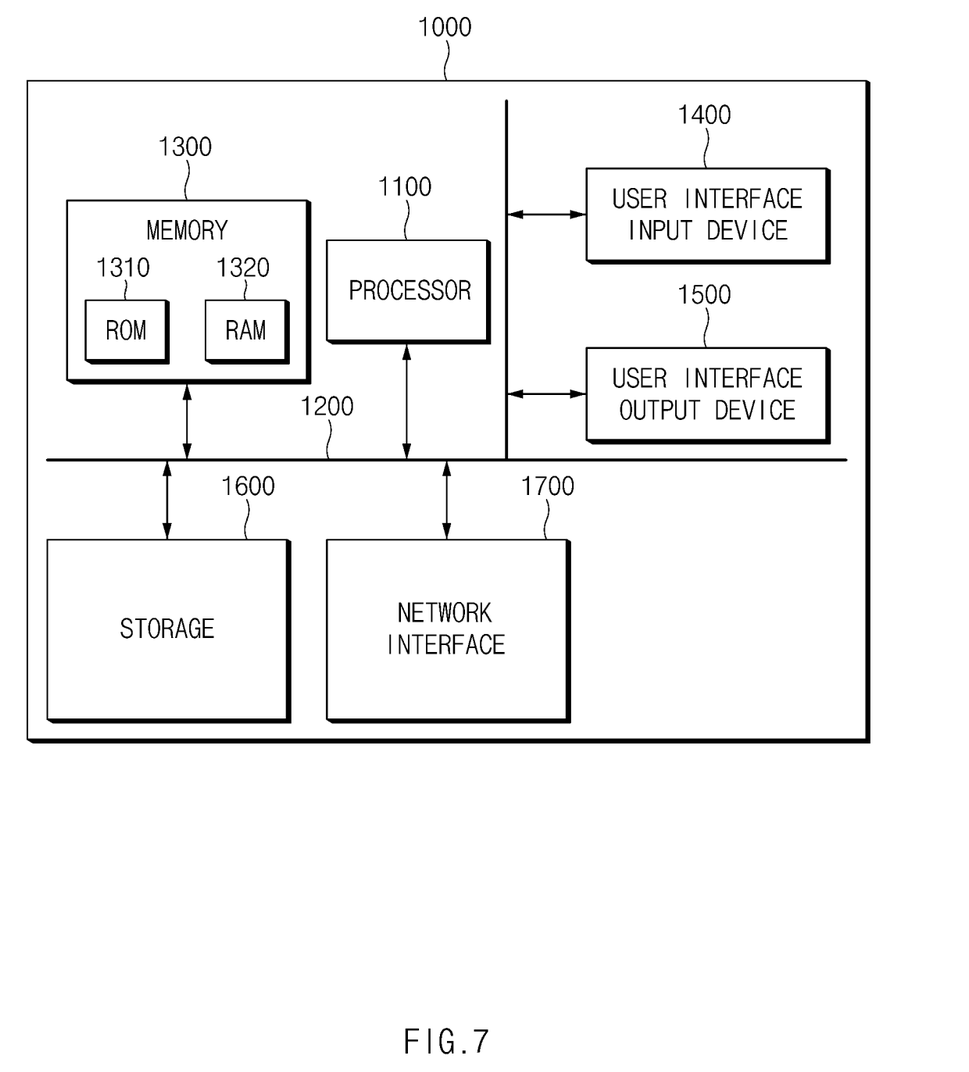
FIG. 7 illustrates a computing system according to an exemplary embodiment of the present disclosure.

FIG. 7 illustrates a computing system according to an exemplary embodiment of the present disclosure.

Referring to FIG. 7, the computing system moo includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments disclosed herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary embodiments disclosed in the present disclosure are not intended to limit the technical ideas of the present disclosure, but to explain them, and the scope of the technical ideas of the present disclosure is not limited by these exemplary embodiments. The protection range of the present disclosure should be interpreted by the claims below, and all technical ideas within the equivalent range should be interpreted as being included in the scope of the present disclosure.

While the present disclosure has been described with reference to illustrative embodiments, this description is not intended to be construed in a limiting sense. Various modifications and combinations of the illustrative embodiments, as well as other embodiments of the present disclosure, will be apparent to persons skilled in the art upon reference to the description. It is therefore intended that the appended claims encompass any such modifications or embodiments.

What is claimed is:

1. A power apparatus comprising:
a fuel cell configured to supply power to an inverter of a vehicle;
a supercapacitor configured to assist the fuel cell;
a bidirectional converter configured to charge and discharge the fuel cell and the supercapacitor; and
a controller configured to drive the vehicle by controlling the supercapacitor to be charged and discharged depending on a current required by the inverter for driving the vehicle and to assist the fuel cell,
wherein the fuel cell and the supercapacitor are connected in series, and wherein the fuel cell and the supercapacitor, connected in series, are connected in parallel with the bidirectional converter.

2. The power apparatus of claim 1, wherein the controller is configured to determine a voltage for driving the vehicle by summing a voltage of the fuel cell and a voltage of the supercapacitor.

3. The power apparatus of claim 1, wherein the bidirectional converter comprises:
a first switch; and
a second switch connected in series with the first switch.

4. The power apparatus of claim 3, wherein the first switch and the second switch are connected in parallel to the fuel cell and the supercapacitor.

5. The power apparatus of claim 3, wherein the controller is configured to determine a steady-state mode to drive the vehicle by using the fuel cell depending on the current required by the inverter of the vehicle, which is necessary for operating the inverter, a peak-load mode to drive the vehicle by using both the fuel cell and the supercapacitor, and a regeneration mode to charge the supercapacitor by using power generated during a regenerative braking.

6. The power apparatus of claim 5, wherein the controller is configured to determine whether the current required by the inverter is equal to or greater than a predetermined maximum current value of the fuel cell, and to perform operation in a heavy peak-mode among a plurality of peak-load modes when the current required by the inverter is equal to or greater than the predetermined maximum current value of the fuel cell.

7. The power apparatus of claim 6, wherein the controller is configured to turn on and off the first switch to operate the bidirectional converter as a buck converter, to limit the current of the fuel cell and to discharge the supercapacitor.

8. The power apparatus of claim 7, wherein the controller is configured to reduce a voltage of the supercapacitor by discharging the supercapacitor to a minimum operating voltage.

9. The power apparatus of claim 5, wherein the controller is configured to:
perform an operation in a light peak-load mode among a plurality of peak-load modes when a value obtained by multiplying a value, obtained by dividing a voltage across the fuel cell by an output voltage, with a maximum current value of the fuel cell is smaller than or equal to the current required by the inverter, the current required by the inverter being smaller than the maximum current value of the fuel cell; and
operate the bidirectional converter as a boost converter by turning on and off the second switch.

10. The power apparatus of claim 9, wherein the controller is configured to:
control an output current of the fuel cell when performing an operation in the steady-state mode to charge the supercapacitor; and
control a current of the fuel cell not to exceed a predetermined maximum current value through constant current constant voltage (CCCV) control when the supercapacitor reaches a rated voltage.

11. The power apparatus of claim 5, wherein the controller is configured to:
perform an operation in the steady-state mode when the current required by the inverter is greater than 0 and smaller than a value obtained by multiplying a value, obtained by dividing a voltage across the fuel cell by an output voltage, with a maximum current value of the fuel cell; and operate the bidirectional converter as a boost converter by turning on and off the second switch.

12. The power apparatus of claim 5, wherein the controller is configured to:
perform an operation in the regenerative mode to limit a current of the fuel cell when the current required by the inverter is smaller than 0;
charge the supercapacitor by using power generated during the regenerative braking; and
operate the bidirectional converter as a buck converter by turning the first switch on and off.

13. The power apparatus of claim 3, further comprising an inductor between a node between the first switch and the second switch and a node between the fuel cell and the supercapacitor.

14. The power apparatus of claim 13, wherein the controller is configured to control an output current of the fuel cell by using a current flowing through the inductor.

15. The power apparatus of claim 1, wherein the bidirectional converter is a buck converter or a boost converter.

16. The power apparatus of claim 1, wherein the controller is configured to perform operation in a pre-charge mode to charge the supercapacitor before driving the vehicle.

17. The power apparatus of claim 16, wherein the controller is configured to control the bidirectional converter to operate as a boost converter to charge the supercapacitor by controlling a current of the fuel cell.

18. A method for operating a power apparatus, wherein the power apparatus comprises a fuel cell for supplying power to an inverter of a vehicle, a supercapacitor for assisting the fuel cell and a bidirectional converter for charging and discharging the fuel cell and the supercapacitor, wherein the fuel cell and the supercapacitor are connected in series, and wherein the fuel cell and the supercapacitor, connected in series, are connected in parallel with the bidirectional converter, the method comprising:
driving, by a controller, the vehicle by controlling the supercapacitor to be charged and discharged depending on a current required by the inverter for driving the vehicle to assist the fuel cell.

19. The method of claim 18, further comprising:
performing, by the controller, an operation in a pre-charge mode to charge the supercapacitor before driving the vehicle; and
determining, by the controller, a steady-state mode to drive the vehicle by using the fuel cell depending on the current required by the inverter for operating the inverter of the vehicle, a peak-load mode to drive the vehicle by using both the fuel cell and the supercapacitor, and a regeneration mode to charge the supercapacitor by using power generated while regenerative braking.

20. A method for operating a power apparatus, wherein the power apparatus comprises a fuel cell for supplying power to an inverter of a vehicle, a supercapacitor for assisting the fuel cell and a bidirectional converter for charging and discharging the fuel cell and the supercapacitor, the method comprising:
performing, by a controller, an operation in a pre-charge mode to charge the supercapacitor before driving the vehicle;
driving, by the controller, the vehicle by controlling the supercapacitor to be charged and discharged depending on a current required by the inverter for driving the vehicle to assist the fuel cell; and
determining, by the controller, a steady-state mode to drive the vehicle by using the fuel cell depending on the current required by the inverter for operating the inverter of the vehicle, a peak-load mode to drive the vehicle by using both the fuel cell and the supercapacitor, and a regeneration mode to charge the supercapacitor by using power generated while regenerative braking.

* * * * *